INVENTORS
ROBERT B. FRIDLEY
BRUCE M. SHAWVER
EMMETT R. HOLEKAMP, DECEASED
BY ELOISE B. HOLEKAMP
LEGAL REPRESENTATIVE

BY

*Lothrop & West*
ATTORNEYS

United States Patent Office 3,545,190
Patented Dec. 8, 1970

3,545,190
TREE SHAKER SUSPENSION
Robert B. Fridley, Davis, and Bruce M. Shawver, Woodland, Calif., and Emmett R. Holekamp, deceased, late of Bozeman, Mont., by Eloise B. Holekamp, legal representative and sole heir, Bozeman, Mont., assignors to The Regents of the University of California, Berkeley, Calif.
Filed Apr. 2, 1968, Ser. No. 718,040
Int. Cl. A01g *19/08*
U.S. Cl. 56—328          9 Claims

ABSTRACT OF THE DISCLOSURE

A tree shaker suspension includes a base on which there is provided a platform that can be rotated with respect to the base about a substantially horizontal transverse axis. A torsion bar at one end is journalled on the platform and at the other end is fixed to the platform. A radial arm is secured to the torsion bar adjacent the journal end thereof and extends upwardly to a journal carrying a mounting extending parallel to the torsion bar and adapted to engage a longitudinally extending tree shaker.

---

The invention relates to devices particularly useful in connection with the employment of a vibrating or oscillating device for shaking the limbs or trunk of a tree for the purpose of dislodging the fruit or nuts therefrom. It is especially concerned with an arrangement in which the oscillations of the tree shaker are cushioned by a mechanism utilizing a torsion bar and is characterized by the provision of mechanism so that the torsion bar has its optimum effect despite variations in the angularity or inclination of the tree shaker in use.

In the operation of tree shakers, which in recent years have become increasingly popular as a means for shaking trees for dislodging the fruit or nuts therefrom, there is always the problem of preventing the same shaking movement which is effective upon the tree from exerting a deleterious or wracking effect upon its support or mounting. Also, it is one of the characteristics of a tree shaker to be positioned at various different angles with respect to the horizontal in engaging various limbs of a tree or various portions of a tree limb, and it is important to have some mechanism for isolating the vibration of the tree shaker despite the angle at which it happens to be disposed.

It is therefore an object of the invention to provide a tree shaker suspension which utilizes a torsion rod to cushion the oscillatory vibration of the tree shaker itself and to isolate much of such vibration from the supporting mechanism and to do this despite variations in the angularity with which or at which the tree shaker is operated.

Another object of the invention is in general to provide an improved mounting for a tree shaker.

A further object of the invention is to provide a tree shaker suspension which can be utilized with any one of a number of different kinds of tree shakers and will afford a freely movable mounting therefor and will not interfere with the normal operation of the tree shaker itself.

Other objects together with the foregoing are attained in the embodiment of the invention described in the accompanying description and illustrated in the accompanying drawings, in which.

Figure 1:
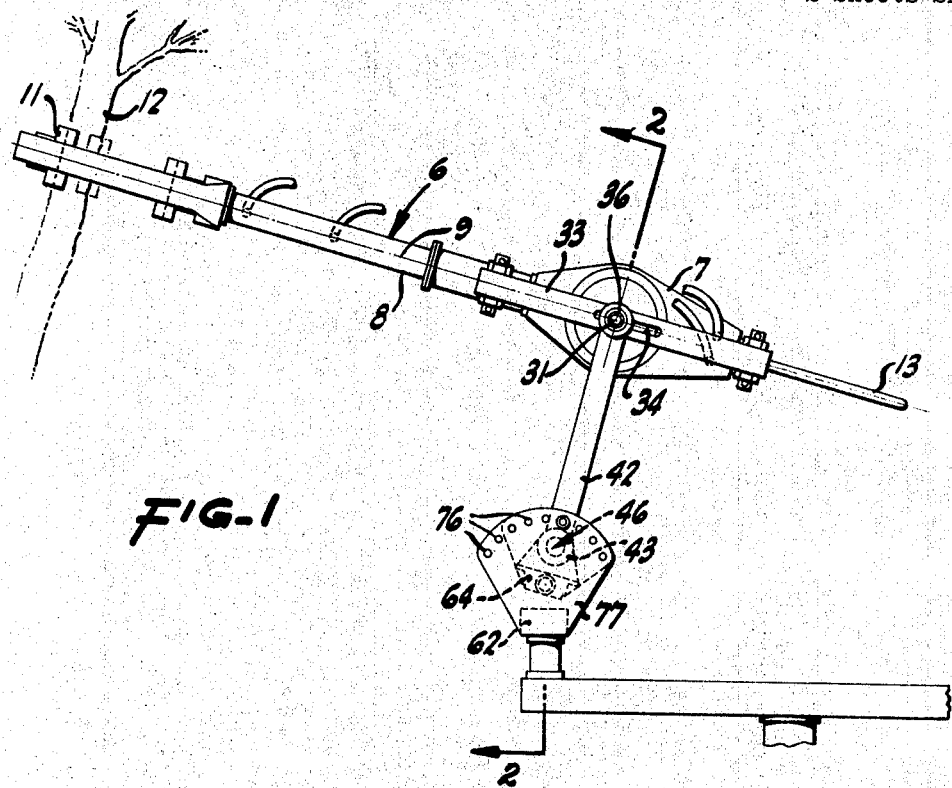
FIG. 1 is a side elevation of a tree shaker suspension constructed in accordance with the invention.
Figure 3:
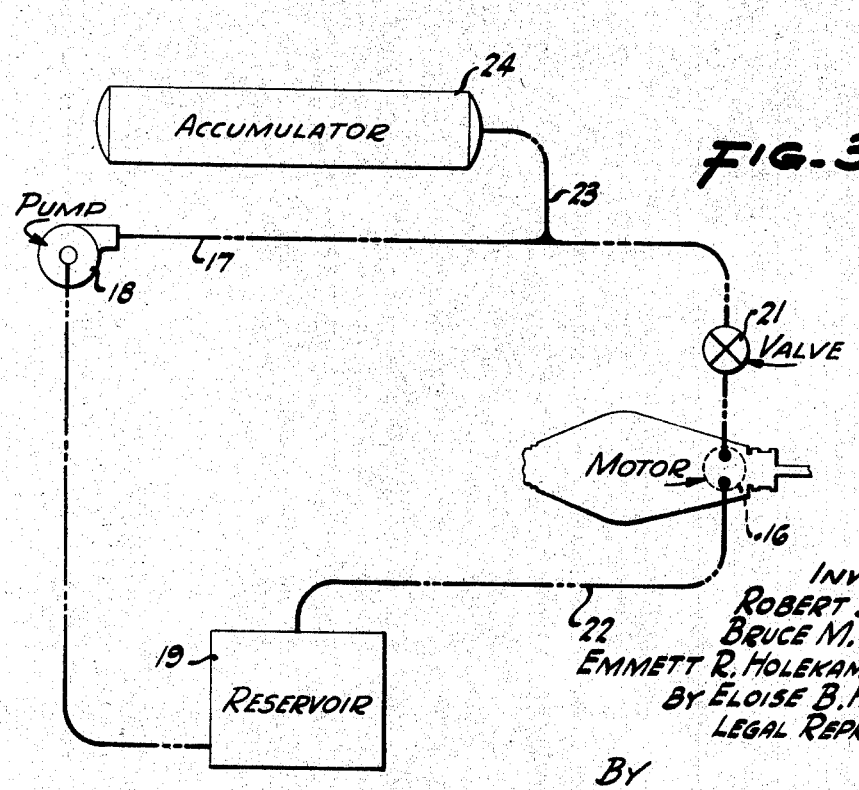
FIG. 3 is a diagrammatic representation of a hydraulic circuit suitable for use with the tree shaker itself.

While the invention can be embodied in a number of different forms, it has successfully been incorporated for use in the form shown herein. In this instance the shaker 6 is of a well-known variety characterized as an inertia shaker and has a hydraulic driving motor (not shown) within a casing 7 arranged at a central location on a boom 8, the entire structure being substantially symmetrical about a longitudinal axis 9. At one end the boom 8 has a clamp or gripping means 11 for engaging a tree limb 12, the axis 9 preferably extending substantially normal or perpendicular to the general extent of the tree limb. At the other end of the motor housing 7 there is a handle 13 which can be grasped by an operator for moving the tree shaker.

Within the housing 7 the propelling device which imparts the longitudinal or axial shake to the mechanism is preferably an appropriate hydraulic motor 16 which is supplied with pressure fluid through a line 17 extending from a pump 18 suitably driven. The pump is supplied with hydraulic fluid from a reservoir 19. A manually controllable valve 21 in the line 17 governs the rate of flow of fluid to the motor 16. The return of fluid is through a return line 22. Preferably, the capacity of the pump 18 is something less than the maximum short-time hydraulic demand of the motor 16. The line 17 is therefore supplemented by a branch line 23 extending to an accumulator housing 24. When the valve 21 is opened near its maximum amount, fluid is supplied through the line 17 to the motor 16 not only from the operating pump 18 but also from the accumulator 24, thus permitting the tree shaker to be operated at somewhat more than the pump capacity for a limited period of time. This operation is particularly useful in connection with the harvesting of olives, which require somewhat more than the normal amount of shaking, at least for a short period, in order initially to dislodge the fruit.

Figure 2:
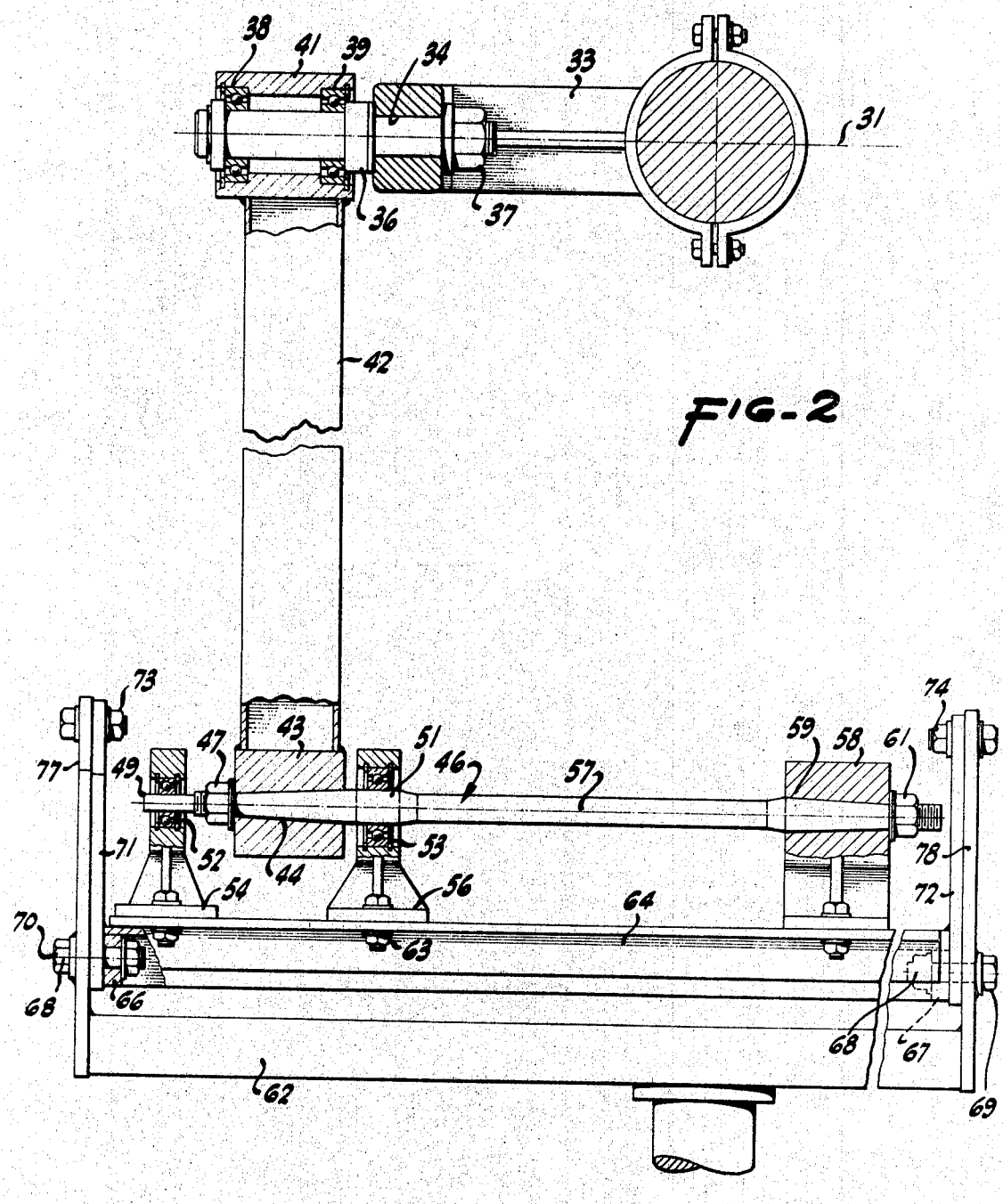
FIG. 2 is a cross section to an enlarged scale of the mechanism shown in FIG. 1, the planes of section being indicated by the lines 2—2 of FIG. 1.

The entire shaker mechanism 6 is reasonably well balanced approximately at the transverse axis 31 (FIG. 2) of the motor housing 7 and at that point is provided with a lateral yoke 33 having a slot 34 surrounding a journal pin 36 fastened tightly in place in the yoke 33 by a securing nut 37. This permits close balancing of the shaker 6 about the axis 31. The pin 36 is included in a mechanism referred to as a "journal mount" that provides for rotation of the yoke 33 and of the shaker mechanism 6 about the axis 31 and also includes bearings 38 and 39 mounted on the pin 36 and in a housing 41 at the upper end of a radial arm 42.

The lower end of the radial arm is formed to provide a hub 43 having a taper bore 44 in which a portion of a torsion bar 46 is disposed. This portion has a corresponding taper and the hub is held in place by a jam nut 47. If desired, the hub and the taper portion can be longitudinally splined or keyed for tight engagement. On opposite sides of the taper portion of the torsion rod there are provided cylindrical portions 49 and 51 that are spaced apart to lie within and to be mounted by antifriction bearings 52 and 53. These are secured in pedestals 54 and 56 so that the alignment of the rod 46 is generally horizontal along an axis 57 parallel to the axis 31.

The opposite end of the torsion bar is mounted in a fixed bracket 58. There is a taper 59 on this opposite end of the torsion bar and a jam nut 61 secures the parts in fastened position so that the torsion bar cannot rotate in or with respect to the bracket 58. If desired and if the frictional engagement is not sufficient, the torsion bar taper 59 and the bracket 58 can readily be keyed or longitudinally splined together.

While in one aspect the brackets 54, 56 and 58 can be fastened directly to a mounting platform 62 which is on a carrying vehicle for the shaker, it is preferred to provide an intermediate arrangement so that the angularity of the mechanism can be varied. For that reason, instead of fastening the brackets 54, 56 and 58 directly to the base 62 they are instead secured by removable fastenings such as 63 to an intervening platform 64 generally in the configuration of a transverse channel having brackets 66 and 67 at its opposite ends. These brackets are mounted for rotation about a horizontal, transverse axis 68 by means of pivot pins 69 and 70. The pivot pins are not ordinarily tight so that the platform 64 can be rotated about the axis 68 of the pivot pins with respect to the base 62. In that way the entire torsion bar mechanism, the upright arm 42 and the shaker 6 can be arranged so that the upper face of the platform 64 is substantially parallel to the axis 9 no matter what inclined position the shaker occupies, within reasonable liimts, That is, the shaker 6 and the arm 42 can be kept approximately at right angles despite inclination of the shaker.

In order to hold the platform in any selected angular position, the brackets 66 and 67 each are fastened to upstanding plates 71 and 72 apertured to receive bolts 73 and 74. These can be positioned in any one of a series of apertures 76 in arcuate end plates 77 and 78 upstanding from the base 62 and fixed thereto.

With this arrangement as soon as the operator has decided the approximate angle at which the shaker 6 will be working he can, by removal of the bolts 73 and 74, rotate the platform 64 about the axis 68 until a proper pair of openings is in alignment, positioning the arm 42 approximately at a right angle to the then operating position of the axis 9. Since the tree shaker oscillates about equal amounts either side of its central position, the angular positioning of the platform and the positioning of the radial arm always at approximately a right angle to the shaker means that the torsion bar has about equal deflections either way from center during ordinary operation even though the shaker arm may be tilted at a rather steep angle. This is effective in maintaining the isolation of the vibration and preventing it from being imparted in any excessive degree to the base 62. It is of course possible to have a continuous adjustment for the platform 64 with respect to the base 62; for example, by a hydraulic cylinder arrangement, but the movable bolt arrangement illustrated is effective in most installations and does not require extra hydraulic machinery.

In operation it has been found that this mounting not only affords the operator great freedom in positioning the shaking mechanism, but likewise provides an equally balanced, simple means for preventing transmission of the shaker vibrations to other parts of the mechanism and provides for a substantially improved result.

What is claimed is:

1. A tree shaker suspension comprising a base, a torsion rod, means connected to said base for journalling said torsion rod with respect to said base for rotation about a predetermined axis, means connected to said base for holding one end of said torsion bar against rotation with respect to said base, an arm having one end secured to said torsion bar adjacent said journalling means and having its other end spaced away from said torsion bar, a journal mount on said other end of said arm, and a tree shaker connected to said journal mount.

2. A tree shaker suspension as in claim 1 in which said tree shaker is elongated and is disposed with the longitudinal axis of said tree shaker substantially normal to said arm.

3. A tree shaker suspension as in claim 1 including a platform, means for securing said means for holding and said means for journalling to said platform, and means for mounting said platform on said base for disposition in any selected one of several rotated positions with respect to said base.

4. A tree shaker suspension as in claim 1 in which said journalling means includes a pair of spaced apart bearings, and said arm is mounted on said torsion bar between said bearings.

5. A tree shaker suspension as in claim 1 in which the means for holding one end of said torsion bar includes means for fixing said one end of said torsion bar in various rotated positions with respect to said base.

6. A tree shaker suspension as in claim 5 in which said journalling means includes means for fixing said journalling means in various rotated positions with respect to said base.

7. A tree shaker suspension as in claim 1 in which said torsion bar is oscillated about a median position during the operation of said tree shaker, and including means for setting said median position in a plane approximately at right angles to the longitudinal axis of said tree shaker.

8. A tree shaker suspension as in claim 1 in which said predetermined axis is disposed substantially horizontally and said arm extends upwardly from said torsion bar.

9. A tree shaker suspension as in claim 1 in which said tree shaker includes hydraulic driving mechanism of lesser capacity than is required to afford a shake of predetermined magnitude to a tree to which said shaker is attached, and a hydraulic accumulator connected in said hydraulic driving mechanism to provide temporarily greater capacity to afford a shake of at least said predetermined magnitude.

References Cited

UNITED STATES PATENTS

| 3,112,652 | 12/1963 | Freeborn | 56—296X |
| 3,121,304 | 2/1964 | Herbst | 56—328 |
| 3,183,656 | 5/1965 | Shipley | 56—328 |
| 3,225,529 | 12/1965 | King | 56—328 |
| 3,377,786 | 4/1968 | Edgemond | 56—328 |

RUSSELL R. KINSEY, Primary Examiner